(12) United States Patent
Kanda et al.

(10) Patent No.: US 6,289,870 B1
(45) Date of Patent: Sep. 18, 2001

(54) DIRECT FUEL INJECTION-TYPE SPARK-IGNITION INTERNAL COMBUSTION ENGINE

(75) Inventors: Mutsumi Kanda, Susono; Rio Shimizu, Mishima; Toshimi Kashiwagura, Susono; Fumiaki Hattori, Mishima, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/535,963

(22) Filed: Mar. 27, 2000

(30) Foreign Application Priority Data

Mar. 30, 1999 (JP) .................................................. 11-89278

(51) Int. Cl.$^7$ ...................................................... F02B 23/10
(52) U.S. Cl. ............................................ 123/298; 123/305
(58) Field of Search ..................................... 123/276, 295, 123/298, 305

(56) References Cited

U.S. PATENT DOCUMENTS

| | | | |
|---|---|---|---|
| 5,259,348 | * 11/1993 | Kobayashi et al. | 123/276 X |
| 5,553,588 | * 9/1996 | Gono et al. | 123/276 |
| 5,720,253 | 2/1998 | Matoba et al. | 123/298 |
| 5,775,288 | 7/1998 | Suzuki et al. | 123/298 |
| 6,035,823 | * 3/2000 | Koike et al. | 123/276 |

FOREIGN PATENT DOCUMENTS

| | | |
|---|---|---|
| 0 519 275 A1 | 12/1992 | (EP) . |
| A-9-158736 | 6/1997 | (JP) . |

* cited by examiner

*Primary Examiner*—Tony M. Argenbright
(74) *Attorney, Agent, or Firm*—Oliff & Berridge, PLC

(57) ABSTRACT

A direct fuel injection, spark-ignition internal combustion engine wherein fuel mainly proceeds toward a spark plug side wall of a cavity along a bottom wall, is deflected by the spark plug side wall and is led to the vicinity of a spark plug. In the engine, the spark plug side wall of the cavity is provided with a deflecting portion inclined toward the inside of the cavity. A first part of the deflecting portion provided on both sides of the spark plug side wall functions to lead the fuel to the vicinity of the spark plug. A second part of the deflecting portion on the central portion of the spark plug side wall functions to lead the fuel to a region neighboring the side of the fuel injection valve from the vicinity of the spark plug.

7 Claims, 2 Drawing Sheets

DIRECT FUEL INJECTION-TYPE SPARK-IGNITION INTERNAL COMBUSTION ENGINE

BACKGROUND OF THE INVENTION

1. Field of the Invention

The present invention relates to a direct fuel injection-type spark-ignition internal combustion engine.

2. Description of the Related Art

There has heretofore been known a stratified charge combustion produced by directly injecting fuel into a cylinder to form a mixture (hereinafter referred to as combustible mixture) that can be favorably ignited only in the vicinity of a spark plug, at the ignition timing, to burn a lean mixture in the cylinder as a whole. To carry out the stratified charge combustion, in general, the fuel injection valve injects fuel in the latter half of the compression stroke. It is intended that the thus injected fuel proceeds into a concave combustion chamber formed in the top surface of the piston, is vaporized by robbing heat from the wall surfaces of the combustion chamber, is deflected by the shape of the combustion chamber toward the spark plug, and forms a combustible mixture near the spark plug.

In the direct fuel injection-type spark-ignition internal combustion engine for performing the stratified charge combustion, in general, the spark plug is arranged nearly at the center in the upper part of the cylinder, the fuel injection valve is arranged in the periphery in the upper part of the cylinder, and the combustion chamber extends from nearly the central portion of the top surface of the piston toward the periphery of the top surface of the piston on the side of the fuel injection valve, and includes the bottom wall, the spark plug side wall, and the fuel injection valve side wall. Fuel injected into the combustion chamber collides with the bottom wall of the combustion chamber, thereafter proceeds toward the spark plug side wall along the bottom wall, and thereafter is deflected toward the spark plug by the spark plug side wall.

In order to favorably vaporize the fuel utilizing heat of the wall surface of the combustion chamber, the distance for moving fuel along the wall surface of the combustion chamber must be lengthened so that the injected fuel stays in contact with the wall surface of the combustion chamber for an extended period. In order to realize this without changing the shape of the combustion chamber, it has been proposed to inject fuel at a relatively large acute angle with respect to the horizontal plane. This makes it possible to move the position where fuel collides with the bottom wall away from the spark plug side wall of the combustion chamber, while maintaining the same position of injection hole of the fuel injection valve, as compared with when the fuel is injected at a relatively small acute angle with respect to the horizontal plane, and, hence, to extend the distance the fuel moves on the bottom wall of the combustion chamber.

When the fuel is injected at a relatively large acute angle with respect to the horizontal plane, however, fuel collided with the bottom surface is diverted and all of fuel does not proceed toward the spark plug side wall along the bottom surface; i.e., fuel only partly proceeds toward the fuel injection valve side wall along the bottom surface.

Accordingly, an amount of the combustible mixture formed near the spark plug via the spark plug side wall of the combustion chamber is decreased, and the engine output is not produced as intended. Besides, the mixture formed by fuel proceeding toward the fuel injection valve side wall of the combustion chamber cannot be favorably burned, and unburned fuel may be emitted in increased amounts.

SUMMARY OF THE INVENTION

It is therefore an object of the present invention to provide a direct fuel injection-type spark-ignition internal combustion engine in which, when stratified charge combustion is carried out, fuel is injected toward the bottom wall of a cavity formed in the top surface of a piston so as to proceed mainly toward the spark plug side wall along the bottom wall of the cavity, is deflected by the spark plug side wall and is led to near the spark plug, and in which even when the fuel that has collided with the wall surface of the cavity is diverted toward the spark plug side wall of the cavity and toward the fuel injection valve side wall, all of fuel injected into the cavity is burned as the combustible mixture to produce the engine output as intended.

According to the present invention, there is provided a direct fuel injection-type spark-ignition internal combustion engine comprising a spark plug, a fuel injection valve and a cavity formed in the top surface of the piston, said cavity having a bottom wall, a spark plug side wall and a fuel injection valve side wall, the fuel injection valve injecting fuel toward the bottom wall of the cavity in stratified charge combustion, the fuel mainly proceeding toward the spark plug side wall of the cavity along the bottom wall, being deflected by the spark plug side wall and being led to the vicinity of the spark plug, wherein the spark plug side wall of the cavity is provided with a deflecting portion inclined toward the inside of the cavity, a first part of the deflecting portion provided on both sides of the spark plug side wall functions to lead the fuel to the vicinity of the spark plug, and a second part of the deflecting portion provided on the central portion of the spark plug side wall functions to lead the fuel to a region neighboring the side of the fuel injection valve from the vicinity of the spark plug.

According to the present invention, there is provided another direct fuel injection-type spark-ignition internal combustion engine comprising a spark plug, a fuel injection valve and a cavity formed in the top surface of the piston, the cavity having a bottom wall, a spark plug side wall and a fuel injection valve side wall, the fuel injection valve injecting fuel toward the bottom wall of the cavity in the stratified charge combustion, the fuel mainly proceeding toward the spark plug side wall of the cavity along the bottom wall, being deflected by the spark plug side wall and being to the vicinity of the spark plug, wherein, at least at a position where the fuel comes into collision, the bottom wall of the cavity is so inclined as to be deeper on the side of the fuel injection valve side wall than on the side of the spark plug side wall, and an extended plane of the central portion of the fuel injection valve side wall intersects the upper wall of the cylinder at an obtuse angle on the side of the spark plug.

The present invention will be more fully understood from the description of preferred embodiments of the invention set forth below, together with the accompanying drawings.

DESCRIPTION OF THE PREFERRED EMBODIMENT

Figure 1:
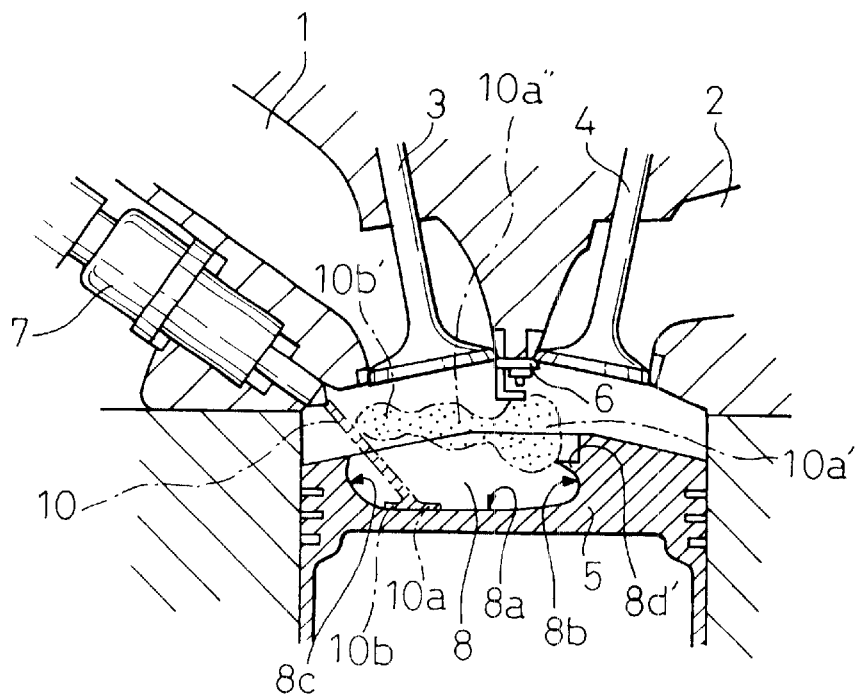
FIG. 1 is a vertical sectional view schematically illustrating a main part of a direct fuel injection-type spark-ignition internal combustion engine according to a first embodiment of the present invention.
Figure 2:
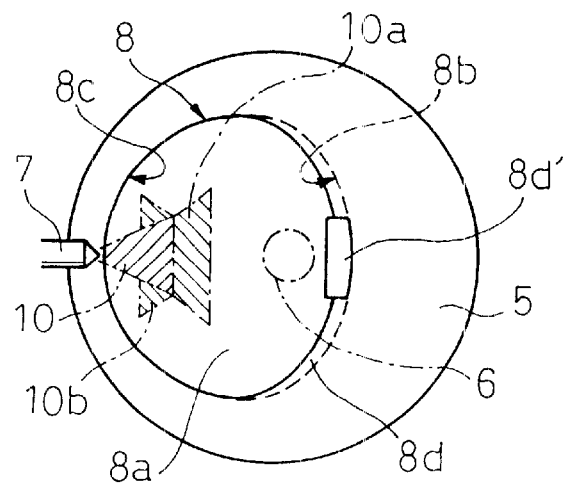
FIG. 2 is a plan view of a piston of FIG. 1.

FIG. 1 is a vertical sectional view schematically illustrating a main part of a direct fuel injection-type spark-ignition internal combustion engine according to a first embodiment of the present invention, and FIG. 2 is a plan view of a piston shown in FIG. 1. In these drawings, reference numeral 1 denotes an intake port and 2 denotes an exhaust port. The intake port 1 is communicated with the cylinder via an intake valve 3, and the exhaust port 2 is communicated with the cylinder via an exhaust valve 4. Reference numeral 5 denotes a piston having a cavity 8 formed in the top surface thereof, and 6 denotes a spark plug arranged in nearly the central upper part of the cylinder.

A fuel injection valve 7 is arranged in the upper periphery of the cylinder in the intake port side and injects fuel in a flat fan shape having a relatively small thickness. The cavity 8 formed in the top surface of the piston extends from nearly the central portion in the top surface of the piston toward the periphery in the top surface of the piston on the fuel injection valve side, and includes the bottom wall 8a, the spark plug side wall 8b and the fuel injection valve side wall 8c. The spark plug 6 is positioned on the center line of the contained angle of the fan of the fan-shaped fuel injected from the fuel injection valve 7, and faces the inside of the spark plug side wall 8b of the cavity 8.

For example, in a uniform charge combustion region where a high engine output is required, the fuel injection valve 7 injects a required amount of fuel in the intake stroke thereby to form a uniform charge mixture in the cylinder at the ignition timing. On the other hand, in a stratified charge combustion region, a required amount of fuel is injected into the cavity 8 in the latter half of the compression stroke. Fuel injected into the cavity 8 collides with the bottom wall 8a of the cavity 8 so as to proceed toward the spark plug side wall 8b along the bottom wall 8a. Fuel proceeding on the bottom wall 8a radially spreads within the contained angle of the fan of fuel, and is gradually vaporized by favorably absorbing heat from a large area of the wall surface of the cavity.

In addition to being smoothly connected to the bottom wall 8a, the spark plug side wall 8b of the cavity 8 has an arcuate shape in a plan view. Further, the distance from the center of the contained angle of the fan of fuel proceeding on the bottom wall 8a of the cavity to the spark plug side wall, is longer than the radius of the arcuate shape. Therefore, each part of fuel in the width direction arriving at the spark plug side wall 8b does not lose much speed, and proceeds along the spark plug side wall 8b. Here, in the central part of fuel in the direction of width, a velocity vector along the bottom wall 8a is converted into an upward velocity vector, and in both side parts of the fuel, due to collision with the spark plug side wall 8b at an acute angle in a plan view, a velocity vector along the bottom wall 8a is converted into a resultant of an upward velocity vector and a velocity vector in the direction of the center line of the contained angle of the fan of fuel. Further, the spark plug side wall 8b is provided with a deflecting portion 8d. Therefore, each part of the fuel proceeding along the spark plug side wall 8b is finally deflected toward the inside of the cavity 8.

Thus, if all of the injected fuel proceeds toward the spark plug side wall 8b on the bottom wall 8a of the cavity 8 and is finally completely vaporized on the spark plug side wall 8b, a combustible mixture is formed near the spark plug at the ignition timing, and thus a favorable stratified charge combustion can be realized.

In order to realize the favorable stratified charge combustion, first, it is important that the injected fuel is all completely vaporized at the ignition timing. If fuel partly exists in the form of a liquid, it does not favorably burn and is discharged as unburned fuel. In this embodiment, the distance for moving fuel along the wall surface of the cavity is lengthened and the injected fuel is permitted to stay contacted with the wall surface of the cavity for an extended period in order to favorably vaporize the fuel by utilizing the heat of the wall surface of the cavity. Concretely speaking, the fuel injection valve 7 injects fuel at a relatively large acute angle with respect to the horizontal plane, whereby the position where fuel collides the bottom wall 8a is moved away from the spark plug side wall 8b of the cavity 8, making it possible to lengthen the distance for moving fuel along the bottom wall 8a of the cavity 8.

However, when the fuel 10 is injected at a relatively large acute angle with respect to the horizontal plane, as shown in FIGS. 1 and 2, the fuel that has come into collision with the bottom wall 8a may be diverted into a fuel 10a proceeding toward the spark plug side wall 8b along the bottom wall 8a and a fuel 10b proceeding toward the fuel injection valve side wall 8c along the bottom wall 8a. The fuel 10b that flows after being thus diverted forms a mixture 10b' on the side of the fuel injection valve 7 in an upper part of the cylinder as shown in FIG. 1.

From the standpoint of quantity, the amount of fuel 10a which proceeds toward the spark plug side wall 8b is the largest and the amount of fuel 10b which proceeds toward the fuel injection valve side wall 8c is the smallest. In the stratified charge combustion, however, only a minimum required amount of fuel is injected in the present engine operating condition. Therefore, if a part of the injected fuel does not exist as a mixture near the spark plug 6, the engine output is not produced as intended. Besides, since the mixture 10b' on the side of the fuel injection valve 7 in the upper part of the cylinder is separated from the combustible mixture 10a' near the spark plug, flame does not propagate well thereto and it can be emitted as unburned fuel.

In order to solve this problem according to this embodiment, a first part 8d of the deflecting portion formed on both sides of the spark plug side wall 8b of the cavity 8 functions to lead the fuel proceeding along the spark plug side wall 8b to the vicinity of the spark plug 6, and a second part 8d' of the deflecting portion formed at the central portion of the spark plug side wall 8b functions to lead the fuel proceeding along the spark plug side wall 8b to the region neighboring the side of the fuel injection valve 7 from the vicinity of the spark plug.

Concretely speaking, an angle of inclination of the second part 8d' of the deflecting portion at the central portion of the spark plug side wall 8b with respect to the bottom wall 8a is smaller than that of the first part 8d of the deflecting portion on both sides of the spark plug side wall 8b. When the parts 8d, 8d' of the deflecting portion have an arcuate shape in vertical cross section, the angle of inclination is an angle between a tangent line at the end thereof and the bottom wall 8a. Further, the position of the second part 8d' of the deflecting portion at the central portion of the spark plug side wall 8b is lower than that of the first part 8d of the deflecting portion on both sides of the spark plug side wall 8b.

Thus, as shown in FIG. 1, both side parts of fuel 10a in the direction of width proceeding toward the spark plug side wall 8b along the bottom wall 8a are deflected by the first part 8d of the deflecting portion on both sides of the spark plug side wall 8b of the cavity 8 to form a combustible mixture 10a' near the spark plug 6, the fuel proceeding toward the fuel injection valve side wall 8c forms a mixture 10b' in the upper part of the cylinder on the side of the fuel injection valve 7, and the central part of fuel 10a in the direction of width proceeding toward the spark plug side wall 8b along the bottom wall 8a is deflected by the second part 8d' of the deflecting portion at the central portion of the spark plug side wall 8b of the cavity 8 to form a mixture 10a" between the combustible mixture 10a' near the spark plug and the mixture 10b' in the upper part of the cylinder on the side of the fuel injection valve 7. Through the mixture 10a", therefore, the mixture 10b' in the upper part of the cylinder on the side of the fuel injection valve 7 and the combustible mixture 10a' near the spark plug merge together to form a mass of combustible mixture. Thus, all of the fuel injected into the cavity 8 can be reliably burned, making it possible to realize a favorable stratified charge combustion to produce the engine output as intended.

Figure 3:
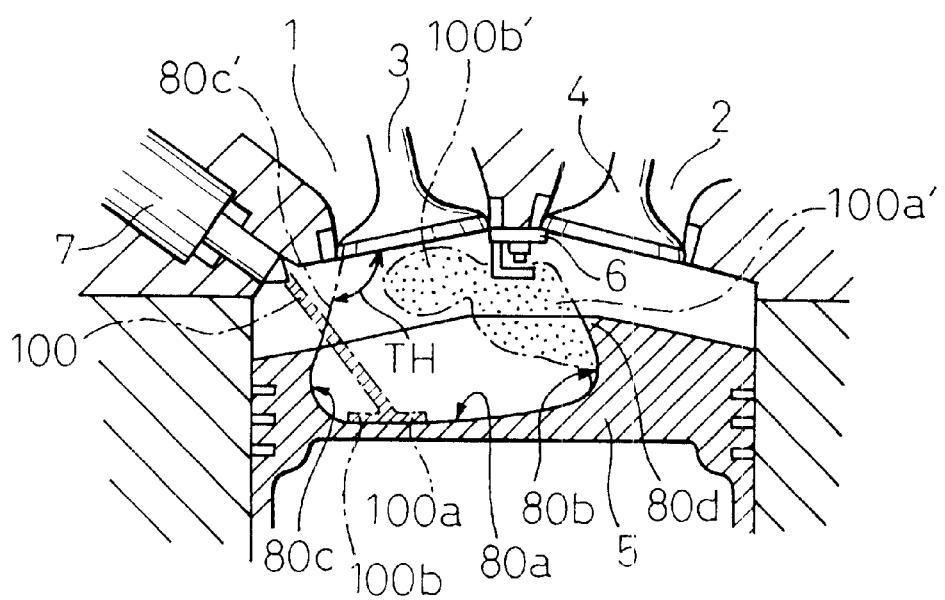
FIG. 3 is a vertical sectional view schematically illustrating a main part of a direct fuel injection-type spark-ignition internal combustion engine according to a second embodiment of the present invention.

FIG. 3 is a vertical sectional view schematically illustrating the direct fuel injection-type spark-ignition internal combustion engine according to a second embodiment of the present invention. Only the differences between the first embodiment and the present embodiment are explained below. In this embodiment, a nearly uniform deflecting portion 80d is formed on the spark plug side wall 80b of the cavity 80, so that fuel 100a proceeding toward the spark plug side wall 80b is all led to the vicinity of the spark plug 6.

At least at a position where fuel collides, further, the bottom wall 80a of the cavity 80 is so inclined as to be deeper on the side of the fuel injection valve side wall 80c than on the side of the spark plug side wall 80b. Further, the central extended plane 80c' of the fuel injection valve side wall 80c intersects the upper wall of the cylinder at an obtuse angle (TH) on the side of the spark plug 6.

Therefore, fuel injected from the fuel injection valve 7 comes into collision with the bottom wall 80a of the cavity 80 at a larger acute angle than that of when the bottom wall of the cavity is flat, whereby an amount of fuel 100b which proceeds toward the fuel injection valve side wall 80c increases and the inertial force thereof for proceeding toward the fuel injection valve side wall 80c increases. The position where fuel collides with the bottom wall 80a of the cavity 80 is relatively close to the fuel injection valve side wall 80c. Therefore, the fuel 100b arrives at the fuel injection valve side wall 80c without spreading much in the direction of width, and rises along the central portion of the fuel injection valve side wall 80c.

The fuel 100b vaporizes upon absorbing heat from the bottom wall 80a of the cavity 80 and from the fuel injection valve side wall 80c, and the thus formed mixture further rises along the extended plane of the central portion of the fuel injection valve side wall 80c. The inertial force of the mixture is dependent upon the inertial force of fuel toward the fuel injection valve side wall 80c, and thus it is relatively great.

Next, the mixture collides with the upper wall of the cylinder at the obtuse angle (TH) and easily moves toward the spark plug 6 along the upper wall of the cylinder due to the relatively large inertial force. Therefore, the mixture merges with the combustible mixture formed near the spark plug 6. Thus, all of the fuel injected into the cavity 80 can be reliably burned, making it possible to realize a favorable stratified charge combustion to produce the engine output as intended.

In this embodiment, an amount of fuel 100b which proceeds toward the fuel injection valve side wall 80c of the cavity 80 increases. However, the mixture formed by this fuel 100b can be reliably merged with the combustible mixture formed near the spark plug 6 due to the relatively large inertial force, without causing any problem.

On the other hand, an amount of fuel 100a which proceeds toward the spark plug side wall 80b of the cavity 80 decreases and, hence, an inertial force thereof for proceeding toward the spark plug side wall 80b decreases. Accordingly, this fuel 100a proceeds at a decreased speed along the bottom wall 80a of the cavity 80 and along the spark plug side wall 80b and, hence, stays in contact with the wall surfaces of the cavity 80 for a correspondingly extended period. Thus, this fuel 100a is easily vaporized. This makes it possible to inject an increased amount of fuel in the latter half of the compression stroke, and to expand the region of stratified charge combustion to realize a low fuel consumption toward the high engine load side. In this case, an amount of fuel 100b which proceeds toward the fuel injection valve side wall 80c of the cavity 80 increases. However, the amount is small in terms of an absolute value. Hence, the fuel 100b can be reliably vaporized by the bottom wall 80a of the cavity 80 and by the fuel injection valve side wall 80c, without causing any problem in the stratified charge combustion.

By the way, in the uniform charge combustion in which fuel is injected during the intake stroke, the amount of fuel injected is larger than that in the stratified charge combustion since the engine load is high. In order to inject this large amount of fuel during the intake stroke, the fuel injection must be started from the initial stage of the intake stroke. In the uniform charge combustion, the injected fuel is diverted in the collision with the bottom wall of the cavity so as to be widely dispersed in the cylinder to form a favorable uniform mixture at the ignition timing.

If a large amount of fuel proceeds only toward the spark plug side wall of the cavity, fuel tends to stay in a liquid form near the boundary between the bottom wall and the spark plug side wall of the cavity. The liquid fuel may not have been sufficiently vaporized at the ignition timing and may be emitted as unburned fuel. Fuel is diverted so as to proceed toward the fuel injection valve side wall of the cavity, whereby an amount of fuel which proceeds toward the spark plug side wall decreases, and thus this problem can be solved. In this embodiment as described above, the problem caused by the diversion of fuel in stratified charge combustion is solved, whereby the diversion of fuel can be positively utilized for uniform charge combustion.

In the above embodiments, the fuel injection valve 7 injects fuel in a fan shape having a relatively small thickness, however, this is not to limit the invention. The above-mentioned effects can be obtained even when fuel is injected in a conical shape or in a cylindrical shape and fuel is diverted due to the collision with the bottom wall of the cavity.

In the above embodiments, the cavity in the top surface of the piston has a shape in which the bottom wall, with which fuel comes into collision, the spark plug side wall for leading fuel proceeding on the bottom wall to the vicinity of the spark plug, and the fuel injection valve side wall can be distinguished. This, however, is not to limit the invention. For example, when the cavity has nearly a semispherical shape and the bottom wall, the spark plug side wall and the fuel injection valve side wall cannot be distinguished in shape, a portion where fuel comes into collision can be intended as the bottom wall of the cavity, a portion for leading fuel proceeding on the bottom wall toward the vicinity of the spark plug can be intended as the spark plug side wall of the cavity, and a portion facing the spark plug side wall can be intended as the fuel injection valve side wall of the cavity.

Although the invention has been described with reference to specific embodiments thereof, it should be apparent that numerous modifications can be made thereto by these skilled in the art, without departing from the basic concept and scope of the invention.

What is claimed is:

1. A direct fuel injection, spark-ignition internal combustion engine comprising a spark plug, a fuel injection valve and a cavity formed on the top surface of the piston, said cavity having a bottom wall, a spark plug side wall and a fuel injection valve side wall, said fuel injection valve injecting fuel toward said bottom wall of said cavity in stratified charge combustion, said fuel mainly proceeding toward said spark plug side wall of said cavity along said bottom wall, being deflected by said spark plug side wall and being led to the vicinity of said spark plug, wherein said spark plug side wall of said cavity is provided with a deflecting portion inclined toward the inside of said cavity, a first part of said deflecting portion provided on both sides of said spark plug side wall functions to lead the fuel to the vicinity of said spark plug, and a second part of said deflecting portion provided on the central portion of said spark plug side wall functions to lead the fuel to a region neighboring the side of said fuel injection valve from said vicinity of the spark plug.

2. A direct fuel injection, spark-ignition internal combustion engine according to claim 1, wherein said fuel is injected at a relatively large acute angle with respect to the horizontal plane and, after collision with said bottom wall, a part of said fuel proceeds toward said fuel injection valve side wall along said bottom wall.

3. A direct fuel injection, spark-ignition internal combustion engine according to claim 1, wherein an angle of inclination of said second part of said deflecting portion with respect to said bottom wall is smaller than that of said first part of said deflecting portion.

4. A direct fuel injection, spark-ignition internal combustion engine according to claim 3, wherein when said first and second parts of said deflecting portion have an arcuate shape in a vertical section, said angle is an angle between a tangent line at the end thereof and said bottom wall.

5. A direct fuel injection, spark-ignition internal combustion engine according to claim 1, wherein the position of said second part of said deflecting portion is lower than that of said first part of said deflecting portion.

6. A direct fuel injection, spark-ignition internal combustion engine comprising a spark plug, a fuel injection valve and a cavity formed on the top surface of the piston, said cavity having a bottom wall, a spark plug side wall and a fuel injection valve side wall, said fuel injection valve injecting fuel toward said bottom wall of said cavity in stratified charge combustion, said fuel mainly proceeding toward said spark plug side wall of said cavity along said bottom wall, being deflected by said spark plug side wall and being led to the vicinity of said spark plug, wherein at least at a position where the fuel comes into collision, said bottom wall of said cavity is so inclined as to be deeper on the side of said fuel injection valve side wall than on the side of said spark plug side wall, and an extended plane of the central portion of said fuel injection valve side wall intersects the upper wall of the cylinder at an obtuse angle on the side of said spark plug.

7. A direct fuel injection, spark-ignition internal combustion engine according to claim 6, wherein said fuel is injected at a relatively large acute angle with respect to the horizontal plane and after the collision with said bottom wall, a part of said fuel proceeds toward said fuel injection valve side wall along said bottom wall.

* * * * *